US012811262B2

(12) United States Patent
Kim et al.

(10) Patent No.: US 12,811,262 B2
(45) Date of Patent: Nov. 24, 2026

(54) CYLINDRICAL LITHIUM ION SECONDARY BATTERY

(71) Applicant: SAMSUNG SDI CO., LTD., Yongin-si (KR)

(72) Inventors: Dae Kyu Kim, Yongin-si (KR); Sung Gwi Ko, Yongin-si (KR); Shin Jung Kim, Yongin-si (KR); Byoung Min Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 435 days.

(21) Appl. No.: 18/520,350

(22) Filed: Nov. 27, 2023

(65) Prior Publication Data

US 2024/0097291 A1 Mar. 21, 2024

Related U.S. Application Data

(63) Continuation of application No. 16/771,642, filed as application No. PCT/KR2017/014600 on Dec. 13, 2017, now Pat. No. 11,831,043.

(51) Int. Cl.
*H01M 50/578* (2021.01)
*H01M 10/04* (2006.01)
(Continued)

(52) U.S. Cl.
CPC ..... *H01M 50/578* (2021.01); *H01M 10/0422* (2013.01); *H01M 10/0525* (2013.01);
(Continued)

(58) Field of Classification Search
None
See application file for complete search history.

(56) References Cited

U.S. PATENT DOCUMENTS 5,821,008 A 10/1998 Harada et al.
5,958,617 A 9/1999 Kozuki et al.
(Continued)

FOREIGN PATENT DOCUMENTS

CN 106920903 A 7/2017
EP 2197064 A1 6/2010
(Continued)

OTHER PUBLICATIONS

Chinese Office Action dated Mar. 21, 2022, issued in Chinese Patent Application No. 201780098162.5. (9 pages).
(Continued)

*Primary Examiner* — Scott J. Chmielecki
(74) *Attorney, Agent, or Firm* — Womble Bond Dickinson (US) LLP

(57) ABSTRACT

The present invention relates to a cylindrical lithium ion secondary battery which, when an upper end of a cylindrical can is clamped, can prevent deformation of a cap assembly so as to improve safety. For an example, a cylindrical lithium ion secondary battery is disclosed, the battery comprising: a cylindrical can; an electrode assembly received in the cylindrical can; and a cap assembly for sealing the cylindrical can, wherein: the cap assembly comprises a top plate having a notch formed thereon, a support plate disposed in close contact with a lower surface of the top plate and including a first through-hole formed through the center thereof, and a bottom plate electrically connected with the electrode assembly and connected to the lower surface of the top plate through the first through-hole; and the support plate has a strength greater than a strength of the top plate.

9 Claims, 5 Drawing Sheets

100

(51) Int. Cl.

| | |
|---|---|
| ***H01M 10/0525*** | (2010.01) |
| ***H01M 50/107*** | (2021.01) |
| ***H01M 50/147*** | (2021.01) |
| ***H01M 50/152*** | (2021.01) |
| ***H01M 50/179*** | (2021.01) |
| ***H01M 50/342*** | (2021.01) |
| ***H01M 50/574*** | (2021.01) |
| ***H01M 50/588*** | (2021.01) |
| ***H01M 50/59*** | (2021.01) |
| ***H01M 50/593*** | (2021.01) |

(52) U.S. Cl.

CPC ....... *H01M 50/107* (2021.01); *H01M 50/147* (2021.01); *H01M 50/152* (2021.01); *H01M 50/179* (2021.01); *H01M 50/3425* (2021.01); *H01M 50/574* (2021.01); *H01M 50/588* (2021.01); *H01M 50/59* (2021.01); *H01M 50/593* (2021.01)

(56) References Cited

U.S. PATENT DOCUMENTS

| | | | | |
|---|---|---|---|---|
| 11,075,427 | B2 | 7/2021 | Chun | |
| 11,831,043 | B2 * | 11/2023 | Kim | H01M 10/0422 |
| 2006/0068273 | A1 | 3/2006 | Yoo | |
| 2006/0078787 | A1 * | 4/2006 | Sato | H01M 50/586 429/174 |
| 2009/0233160 | A1 * | 9/2009 | Kim | H01M 50/56 429/185 |
| 2010/0136388 | A1 | 6/2010 | Kim et al. | |
| 2010/0310906 | A1 | 12/2010 | Kim et al. | |
| 2011/0189513 | A1 * | 8/2011 | Suzuki | H01M 50/147 29/623.2 |
| 2014/0377599 | A1 * | 12/2014 | Shimizu | H01M 10/0431 429/53 |
| 2015/0194644 | A1 * | 7/2015 | Jung | H01M 50/171 429/56 |
| 2015/0287965 | A1 * | 10/2015 | Kim | H01M 50/581 429/82 |
| 2017/0062778 | A1 * | 3/2017 | Mille | H01M 10/052 |
| 2017/0187019 | A1 | 6/2017 | Chun | |
| 2018/0047949 | A1 * | 2/2018 | Sugimoto | H01M 10/0422 |
| 2018/0159101 | A1 * | 6/2018 | Tsang | H01M 50/152 |
| 2019/0363315 | A1 * | 11/2019 | Kim | H01M 50/30 |

FOREIGN PATENT DOCUMENTS

| | | | |
|---|---|---|---|
| JP | H 08-153510 | A | 6/1996 |
| JP | H9-134715 | A | 5/1997 |
| JP | P2000-11980 | A | 1/2000 |
| JP | P2008-262744 | A | 10/2008 |
| KR | 10-2006-0028060 | A | 3/2006 |
| KR | 10-2010-0125951 | A | 12/2010 |
| KR | 10-2016-0034794 | A | 3/2016 |
| KR | 10-2017-0012138 | A | 2/2017 |

OTHER PUBLICATIONS

EPO Extended European Search Report dated May 17, 2021, issued in corresponding European Patent Application No. 17934376.9 (7 pages).

International Search Report with English Translation for corresponding Korean International Application No. PCT/KR2017/014600, dated Nov. 28, 2018, 5 pages.

* cited by examiner

CYLINDRICAL LITHIUM ION SECONDARY BATTERY

CROSS-REFERENCE TO RELATED APPLICATIONS

This application is a continuation of U.S. patent application Ser. No. 16/771,642, filed Jun. 10, 2020, which claims priority to and the benefit of National Phase Patent Application of International Patent Application Number PCT/KR2017/014600, filed on Dec. 13, 2017. The entire contents of which are incorporated herein by reference.

TECHNICAL FIELD

The present invention relates to a cylindrical lithium ion secondary battery.

BACKGROUND ART

Lithium ion secondary batteries are being widely used in portable electronic devices and power sources of hybrid automobiles or electric vehicles because of various advantages, including a high operation voltage, a high energy density per unit weight, and so forth.

The lithium ion secondary battery can be largely classified as a cylinder type secondary battery, a prismatic type secondary battery, a pouch type secondary battery. Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

DESCRIPTION OF EMBODIMENTS

Technical Problem

Various embodiments of the present invention provide a cylindrical lithium ion secondary battery which, when an upper end of a cylindrical can is clamped, can prevent deformation of a cap assembly so as to improve safety.

Solution to Problem

According to various embodiments of the present invention, provided is a cylindrical lithium ion secondary battery comprising: a cylindrical can; an electrode assembly received in the cylindrical can; and a cap assembly for sealing the cylindrical can, wherein the cap assembly comprises a top plate having a notch formed thereon, a support plate disposed in close contact with a lower surface of the top plate and including a first through-hole formed through the center thereof, and a bottom plate electrically connected with the electrode assembly and connected to the lower surface of the top plate through the first through-hole; and wherein the support plate has a strength greater than a strength of the top plate.

The support plate may include a first region having the first through-hole formed thereon, a second region positioned at an exterior side of the first region and positioned lower than the first region, and a third region connecting the first region and the second region to each other and including a plurality of second through-holes formed thereon.

The third region may be formed to be tilted to disperse the stress generated when an upper end of the cylindrical can is clamped to fix the cap assembly to the cylindrical can.

A ring-shaped groove may be formed on the second region to disperse the stress generated when an upper end of the cylindrical can is clamped to fix the cap assembly to the cylindrical can.

The groove may be formed to have a depth of 5% to 20% of a thickness of the support plate.

The cylindrical lithium ion secondary battery may further include an insulation plate positioned between the support plate and the bottom plate and having a through-hole centrally located to correspond to the first through-hole of the support plate.

If the internal gas pressure of the cylindrical can is greater than a predetermined operating pressure and smaller than a predetermined breaking pressure, the top plate may be upwardly convexly deformed, and the top plate may then be electrically disconnected from the bottom plate.

If the internal gas pressure of the cylindrical can is greater than a predetermined breaking pressure, the notch of the top plate may be broken.

The cylindrical lithium ion secondary battery may further include an insulation gasket positioned between the cap assembly and the cylindrical can and insulating the cap assembly and the cylindrical can from each other.

Advantageous Effects of Invention

As described above, the cylindrical lithium ion secondary battery according to various embodiments of the present invention includes a support plate having a strength greater than that of a top plate to alleviate the stress generated toward the center of a cap assembly when an upper end of a cylindrical can is clamped, thereby preventing deformation of the top plate and improving safety.

The cylindrical lithium ion secondary battery according to various embodiments of the present invention includes a support plate having a stepped portion to decentralize the stress generated toward the center of a cap assembly when an upper end of a cylindrical can is clamped, thereby preventing deformation of the top plate and improving safety.

The cylindrical lithium ion secondary battery according to various embodiments of the present invention includes a support plate having a groove to decentralize the stress generated toward the center of a cap assembly when an upper end of a cylindrical can is clamped, thereby preventing deformation of the top plate and improving safety.

MODE OF INVENTION

Figure 1:
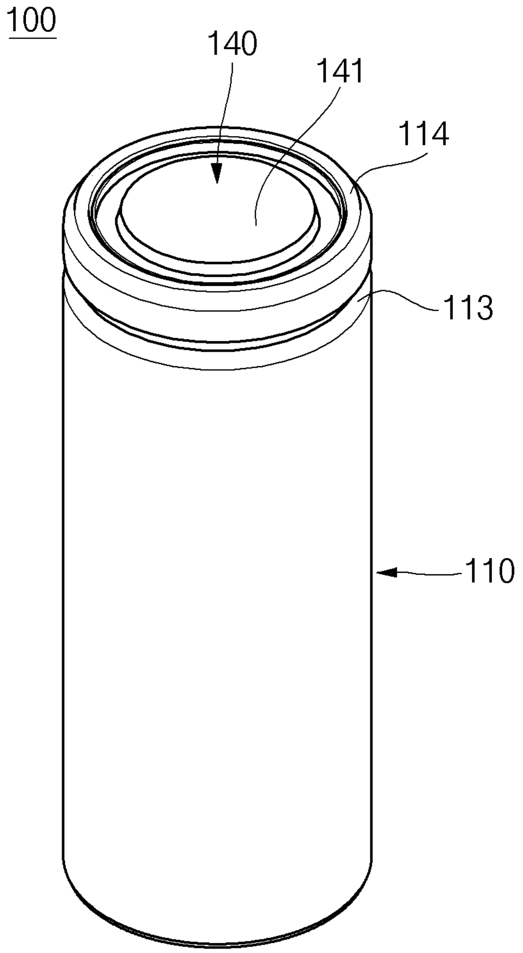
FIG. 1 is a perspective view of a cylindrical lithium ion secondary battery according to an embodiment of the present invention.

Hereinafter, embodiments of the present invention will be described in detail.

The embodiments of the present invention, however, may be modified in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
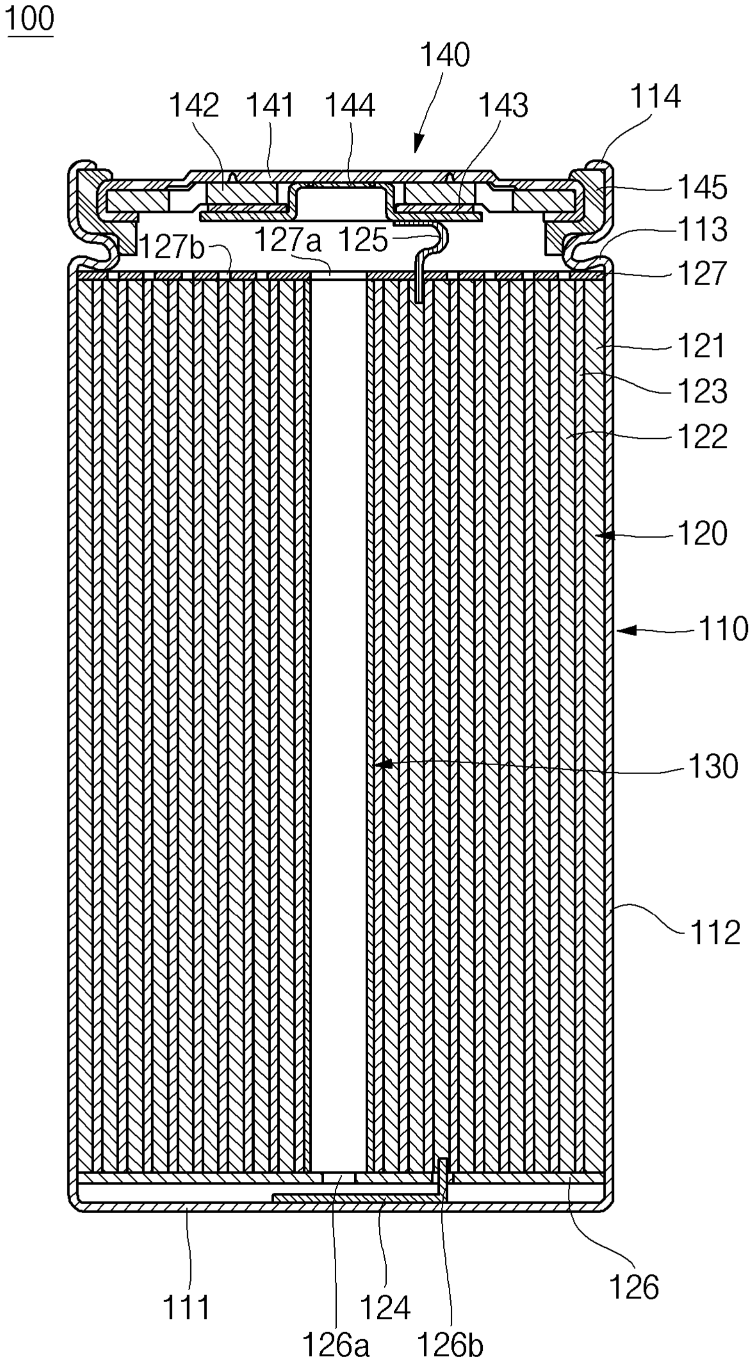
FIG. 2 is a cross-sectional view of the cylindrical lithium ion secondary battery according to an embodiment of the present invention.
Figure 3:
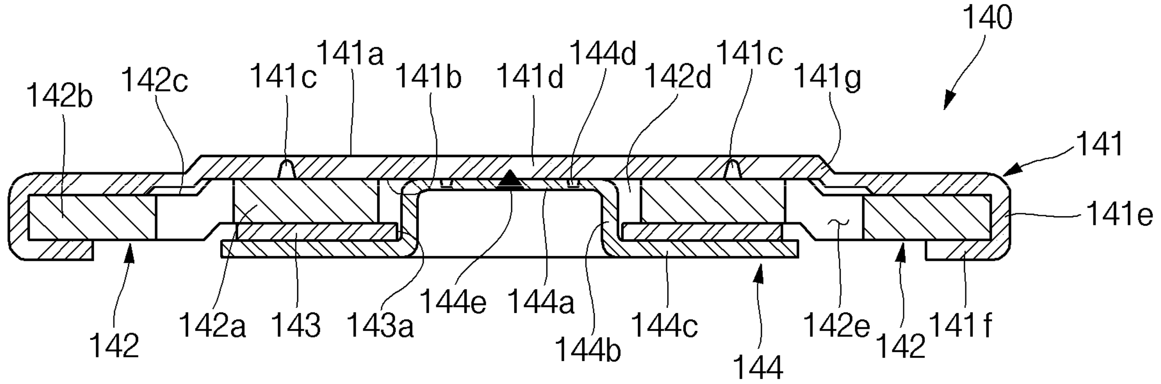
FIG. 3 is an enlarged cross-sectional view illustrating only a cap assembly of the cylindrical lithium ion secondary battery according to an embodiment of the present invention.
Figure 4:
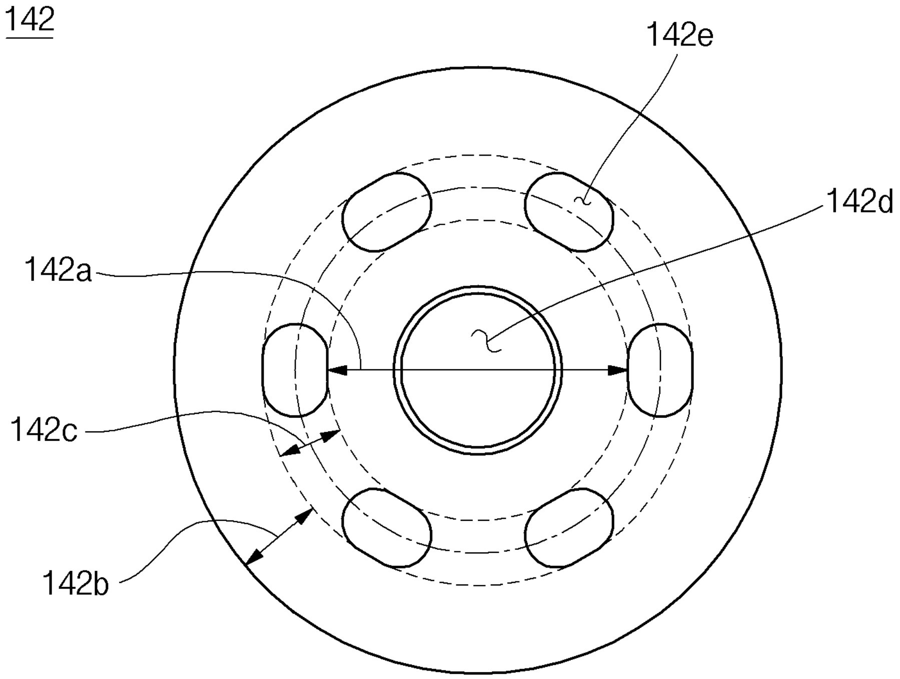
FIG. 4 is a plan view illustrating a support plate of the cylindrical lithium ion secondary battery according to an embodiment of the present invention.

FIG. 1 is a perspective view of a cylindrical lithium ion secondary battery according to an embodiment of the present invention. FIG. 2 is a cross-sectional view of the cylindrical lithium ion secondary battery according to an embodiment of the present invention. FIG. 3 is an enlarged cross-sectional view illustrating only a cap assembly of the cylindrical lithium ion secondary battery according to an embodiment of the present invention. FIG. 4 is a plan view illustrating a support plate of the cylindrical lithium ion secondary battery according to an embodiment of the present invention.

Referring to FIGS. 1 to 4, the cylindrical lithium ion secondary battery 100 according to an embodiment includes a cylindrical can 110, an electrode assembly 120, and a cap assembly 140. In some instances, the cylindrical lithium ion secondary battery 100 may further include a center pin 130.

The cylindrical can 110 includes a circular bottom portion 111 and a side wall 112 upwardly extending a predetermined length from the bottom portion 111. In the process of manufacturing the secondary battery, a top portion or top end of the cylindrical can 110 is left open. Therefore, in the process of assembling the secondary battery 100, the electrode assembly 120 and the center pin 130 may be inserted into the cylindrical can 110 together with an electrolyte. The cylindrical can 110 may be made of steel, a steel alloy, aluminum, an aluminum alloy, or an equivalent thereof, but embodiments of the present invention are not limited thereto. In addition, an inwardly recessed beading part 113 may be formed below the cap assembly 140 to prevent the cap assembly 140 from being deviated to the outside and an inwardly bent crimping part 114 may be formed on or above the beading part 113.

The electrode assembly 120 is accommodated within the cylindrical can 110. The electrode assembly 120 includes a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, or $LiMn_2O_4$), and a separator 123 interposed between the negative electrode plate 121 and the positive electrode plate 122 to prevent a short circuit between the negative electrode plate 121 and the positive electrode plate 122 while allowing only movement of lithium ions. The negative electrode plate 121, the positive electrode plate 122, and the separator 123 are wound in a substantially cylindrical shape or configuration. Here, the negative electrode plate 121 may be formed of a copper (Cu) foil, the positive electrode plate 122 may be formed of an aluminum (Al) foil, and the separator 123 may be made of polyethylene (PE) or polypropylene (PP), but embodiments of the present invention are not limited thereto. In addition, a negative electrode tab 124 may be welded to the negative electrode plate 121 to downwardly protrude and extend a predetermined length therefrom, and a positive electrode tab 125 may be welded to the positive electrode plate 122 to upwardly protrude and extend a predetermined length therefrom, or vice versa. In addition, the negative electrode tab 124 may be made of nickel (Ni), and the positive electrode tab 125 may be made of aluminum, but embodiments of the present invention are not limited thereto.

In addition, the negative electrode tab 124 of the electrode assembly 120 may be welded to the bottom portion 111 of the cylindrical can 110. Therefore, the cylindrical can 110 may function as a negative electrode. In other embodiments, the positive electrode tab 125 may be welded to the bottom portion 111 of the cylindrical can 110. In these embodiments, the cylindrical can 110 may function as a positive electrode.

Additionally, a first insulation plate 126, which is coupled to the cylindrical can 110 and has a first hole 126*a* formed at its center and a second hole 126*b* formed around the first hole 126*a*, may be interposed between the electrode assembly 120 and the bottom portion 111 of the cylindrical can 110. The first insulation plate 126 may prevent the electrode assembly 120 from electrically contacting the bottom portion 111 of the cylindrical can 110. Specifically, the first insulation plate 126 prevents the positive electrode plate 122 of the electrode assembly 120 from electrically contacting the bottom portion 111. Here, when a relatively large amount of gas is generated due to an abnormality in the secondary battery, the first hole 126*a* allows the gas to rapidly move upwardly through the center pin 130, and the second hole 126*b* allows the negative electrode tab 124 to pass therethrough to be welded to the bottom portion 111.

In addition, a second insulation plate 127, which is coupled to the cylindrical can 110 and has a first hole 127*a* formed at its center and a plurality of second holes 127*b* formed around the first hole 127*a*, may be interposed between the electrode assembly 120 and the cap assembly 140. The second insulation plate 127 may prevent the electrode assembly 120 from electrically contacting the cap assembly 140. Specifically, the second insulation plate 127 prevents the negative electrode plate 121 of the electrode assembly 120 from electrically contacting the cap assembly 140. Here, when a relatively large amount of gas is generated due to an abnormality in the secondary battery, the first hole 127*a* allows the gas to rapidly move to the cap assembly 140, and the second holes 127*b* allow the positive electrode tab 125 to pass therethrough to be welded to the cap assembly 140. In addition, during injection of an electrolyte, the other second hole 127*b* allows the electrolyte to rapidly flow into the electrode assembly 120.

Additionally, since diameters of the first holes 126*a* and 127*a* of the first and second insulation plates 126 and 127 are smaller than a diameter of the center pin 130, the center pin 130 may be prevented from electrically contacting the bottom portion 111 of the cylindrical can 110 or the cap assembly 140 due to external impacts.

The center pin 130 is a hollow cylinder pipe and may be coupled to an approximately central area of the electrode assembly 120. The center pin 130 may be made of steel, a steel alloy, aluminum, an aluminum alloy, or polybutylene terephthalate, but embodiments of the present invention are not limited thereto. The center pin 130 may suppress deformation of the electrode assembly 120 during charging and discharging of the secondary battery and may function as a movement passage for gas generated in the secondary battery.

The cap assembly 140 may include a top plate 141, a support plate 142, an insulation plate 143, and a bottom plate 144.

The top plate 141 may include a substantially planar first surface 141*a* and a substantially planar second surface 141*b* opposite to the first surface, and specifically may further include at least one notch 141*c* formed on a lower surface 141*b*. The notch 141*c* may be ruptured when the internal gas pressure of the secondary battery is greater than a predetermined breaking pressure, thereby rapidly releasing the internal gas of the secondary battery to the outside.

In addition, the top plate 141 may include an upper region 141*d*, a side region 141*e* and a lower region 141*f*. The upper region 141*d* may positioned on a support plate 142 and may be substantially planar. The upper region 141*d* may serve as a terminal of the secondary battery, and thus may be electrically connected to an external device (e.g., a load or a charger). The side region 141*e* may be downwardly bent from the upper region 141*d* to substantially encompass a side portion of the support plate 142. The lower region 141*f* is horizontally inwardly bent from the side region 141*e* to then be positioned at a bottom portion of the support plate 142. In such a manner, the top plate 141 may be integrally formed with the support plate 142 by the upper region 141*d*, the side region 141*e*, and the lower region 141*f*.

The top plate 141 may be made of, for example, aluminum, aluminum, an aluminum alloy or equivalents thereof, but embodiments of the present invention are not limited to the above materials. Accordingly, a bus bar or an external lead, made of aluminum, may be easily welded to the top plate 141. Specifically, the top plate 141 may be made of soft aluminum having a first strength, and thus may be ruptured when the internal pressure of the secondary battery is greater than or equal to a predetermined reference pressure.

In some cases, the top plate 141 may further include a bent region 141*g* formed at the upper region 141*d*. When viewed from below, the bent region 141*g* may be shaped of a substantially circular ring. As an example, the upper region 141*d* located inside the bent region 141*g* may be positioned higher than the upper region 141*d* located outside the bent region 141*g*. In addition, the notch 141*c* may be formed on the upper region 141*d* located inside the bent region 141*g*.

The support plate 142 may be positioned under the top plate 141 and may include a first region 142*a*, a second region 142*b* and a third region 142*c*. The first region 142*a* may be formed at a region corresponding to the upper region of the top plate 141. Specifically, the first region 142*a* is formed in close contact with the upper region 141*d* of the top plate 141 located inside the bent region 141*g*. In addition, a first through-hole 142*d* is formed substantially at the center of the first region 142*a*. Here, a bottom plate 144, which will later be described, may pass through the first through-hole 142*d* to then be electrically connected to the top plate 141, and the first through-hole 142*d* may allow the internal gas pressure to be directly applied to the top plate 141. The second region 142*b* is positioned at an exterior side of the first region 142*a* and is positioned lower than the first region 142*a*. That is to say, a step difference is generated between the first region 142*a* and the second region 142*b*. Particularly, the second region 142*b* is disposed in close contact with the upper region 141*d* located outside the bent region 141*g* of the top plate 141. Therefore, the second region 142*b* is surrounded by the upper region 141*d*, the side region 141*e* and the lower region 141*f*, which are located outside the bent region 141*g*. The third region 142*c* is positioned between the first region 142*a* and the second region 142*b* and connects the first region 142*a* and the second region 142*b* to each other. In addition, the third region 142*c* may be tilted (bent) to connect the first region 142*a* and the second region 142*b* having different heights to each other. That is to say, the third region 142*c* is shaped to correspond to the bent region 141*g* of the top plate 141. As such, the support plate 142 is generally configured to make contact with the lower surface 141*b* of the top plate 141.

Additionally, the third region 142*c* may prevent deformation of the cap assembly 140 by dispersing the force applied to the cap assembly 140, specifically the stress generated toward the center of the cap assembly 140 when an upper end of the cylindrical can 110 is clamped. In addition, a plurality of second through-holes 142*e* are formed in the third region 142*c*. Here, the second through-holes 142*e* may allow the internal gas pressure to be directly applied to the top plate 141. For example, the notch 141*c* formed on the lower surface 141*b* of the top plate 141 may be positioned at a region corresponding to the first region 142*a* positioned between the first through-hole 142*d* and each of the second through-holes 142*e* of the support plate 142, but embodiments of the present invention are not limited thereto.

The support plate 142 may be made of aluminum, an aluminum alloy or equivalents thereof. Specifically, the support plate 142 may be made of rigid aluminum having a second strength higher than the first strength of the top plate 141. Therefore, when an external force is applied to the cap assembly 140, specifically when the upper end of the cylindrical can 110 is clamped, the support plate 142 may prevent deformation of the top plate 141 by supporting the top plate 141.

The insulation plate 143 may be positioned under (attached to a bottom portion of) the support plate 142 and may include a through-hole 143*a* located to correspond to the first through-hole 142*a*. When viewed from below, the insulation plate 143 may be shaped of a substantially circular ring having a predetermined width. In addition, the insulation plate 143 serves to insulate the support plate 142 and the bottom plate 144 from each other. For example, the insulation plate 143 may be positioned between the support plate 142 and the bottom plate 144 and may be subjected to ultrasonic welding, but embodiments of the present invention are not limited thereto.

The insulation plate 143 may be made of, for example, polyethylene (PE), polypropylene (PP), ethylene propylene diene monomer (M-class) rubber (EPDM rubber), or equivalents thereof, but embodiments of the present invention are not limited to the above materials.

The bottom plate 144 is electrically connected to the top plate 141 through the through-hole 143*a* of the insulation plate 143 and the first through-hole 142*a* of the support plate 142 to then be attached to the insulation plate 143. That is to say, the bottom plate 144 may include a first area 144*a* connected (welded) to the upper region 141*d* of the top plate 141, a second area 144*b* bent from the first area 144*a* and passing through the first through-hole 142*a* of the support plate 142 and the through-hole 143*a* of the insulation plate 143, and a third area 144*c* bent from the second area 144*b* and attached to the insulation plate 143. In FIG. 3, undefined reference numeral 144*e* refers to a welding region in which the first area 144*a* of the bottom plate 144 is welded to the lower surface 141*b* of the upper region 141*d* of the top plate 141.

Here, the positive electrode tab 125 may be electrically connected to the third area 144*c* of the bottom plate 144. In addition, one or more notches 144*d* may further be formed on the first area 144*a* of the bottom plate 144. When the internal gas pressure of the battery is greater than a predetermined pressure, the top plate 141 may be upwardly convexly deformed, and the notches 144*d* may serve to electrically separate the first area 144*a* of the bottom plate 144 from the second area 144*b*. Accordingly, a current path between the top plate 141 and the bottom plate 144 may be blocked.

The bottom plate 144 may be made of, for example, aluminum, aluminum, an aluminum alloy or equivalents thereof, and thus the positive electrode tab 125 made of aluminum may be easily welded thereto.

For example, in the cylindrical lithium ion secondary battery 100 according to an embodiment, when the internal gas pressure of the cylindrical can 110 is greater than a predetermined first pressure (operating pressure) and smaller than a predetermined second pressure (breaking pressure), the top plate 141 may be upwardly convexly deformed by the internal gas pressure, so that the top plate 141 is electrically disconnected from the bottom plate 144. In addition, in the cylindrical lithium ion secondary battery 100 according to an embodiment, when the internal gas pressure of the cylindrical can 110 is greater than the predetermined second pressure (breaking pressure), the notch 141*c* formed on the top plate 141 is ruptured, the internal gas existing inside the secondary battery may be rapidly released to the outside, thereby preventing explosion of the secondary battery and ultimately improving safety.

The cap assembly 140 may further include an insulation gasket 145 insulating the top plate 141 and the sidewall 112 of the cylindrical can 110 from each other. Here, the insulation gasket 145 is configured to be substantially compressed between the beading part 113 and the crimping part 114, each of which are formed at the side wall 112 of the cylindrical can 110. In addition, the insulation gasket 145 may substantially encompass the side region 141*e* of the top plate 141, and the upper region 141*d* and the lower region 141*f*, which are located around side region 141*e*.

Additionally, an electrolyte (not shown) is injected into the cylindrical can 110, and lithium ions generated by an electrochemical reaction in the negative electrode plate 121 and the positive electrode plate 122 in the secondary battery during charging and discharging are allowed to move. The electrolyte may be a non-aqueous, organic electrolyte including a mixture of a lithium salt and a high-purity organic solvent. In addition, the electrolyte may be a polymer using a polymer electrolyte or a solid electrolyte, but embodiments of the present invention are not limited to the above electrolytes.

Figure 5:
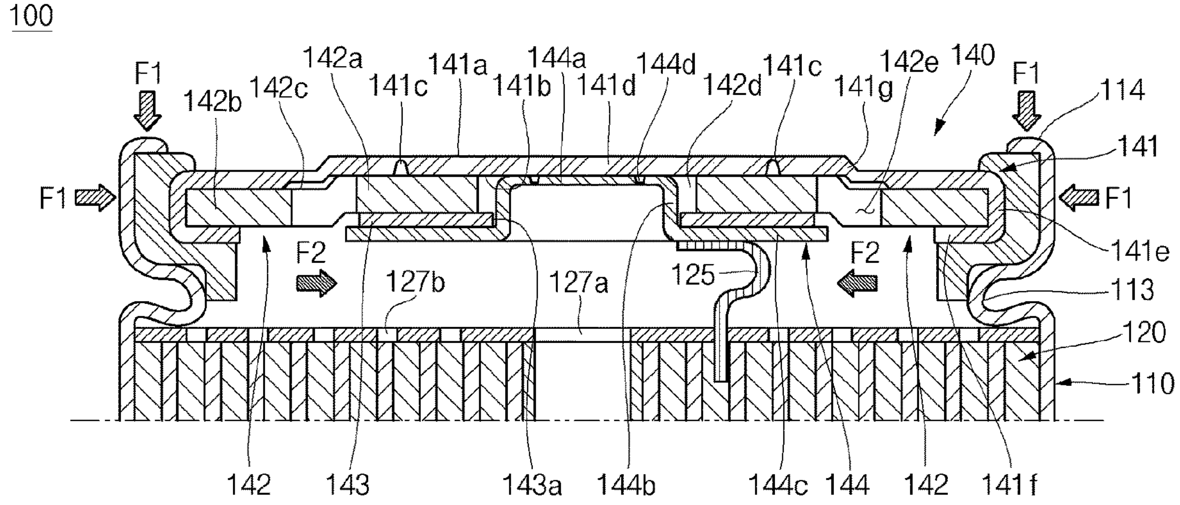
FIG. 5 is a cross-sectional view illustrating stress generated when a crimping part is formed in the cylindrical lithium ion secondary battery according to an embodiment of the present invention.

FIG. 5 is a cross-sectional view illustrating stress generated when a crimping part is formed in the cylindrical lithium ion secondary battery according to an embodiment of the present invention.

As illustrated in FIG. 5, when the upper end of the cylindrical can 110 is clamped to fix the cap assembly 140 to the cylindrical can 110, a force F1 is applied in a downward direction with respect to the cap assembly 140 and in an inward direction with respect to the cap assembly 140. With the force F1 applied, stress F2 is generated toward the center of the cap assembly 140, resulting in deformation of the cap assembly 140, so that the cap assembly 140 is centrally depressed. Accordingly, the cylindrical lithium ion secondary battery 100 may undergo changes in the component characteristics. Particularly, the first pressure (operating pressure) and the second pressure (breaking pressure) of the top plate 141 may change, and the top plate 141 may not properly operate under a given pressure.

In the present invention, however, the support plate 142 having a higher strength than the top plate 141 (that is, having the second strength higher than the first strength of the top plate 141) is provided, thereby alleviating the stress generated toward the center of the cap assembly 140 when the upper end of the cylindrical can 110 is clamped. Accordingly, the support plate 142 may improve the safety of the cylindrical lithium ion secondary battery 100 by preventing deformation of the top plate 141.

In addition, since the third region 142*c*, in which a step difference is generated due to a height difference between the first region 142*a* and the second region 142*b*, is formed in the support plate 142, the stress generated toward the center of the cap assembly 140 when the upper end of the cylindrical can 110 is clamped, may be decentralized.

Accordingly, the support plate 142 may improve the safety of the cylindrical lithium ion secondary battery 100 by preventing deformation of the top plate 141.

Figure 6:
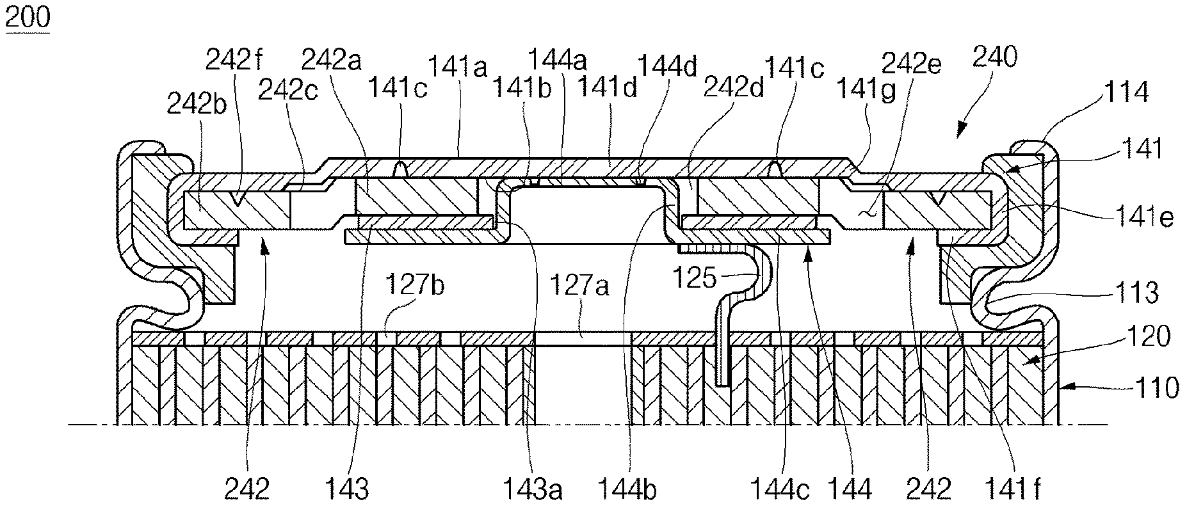
FIG. 6 is a cross-sectional view of a cylindrical lithium ion secondary battery according to another embodiment of the present invention.
Figure 7:
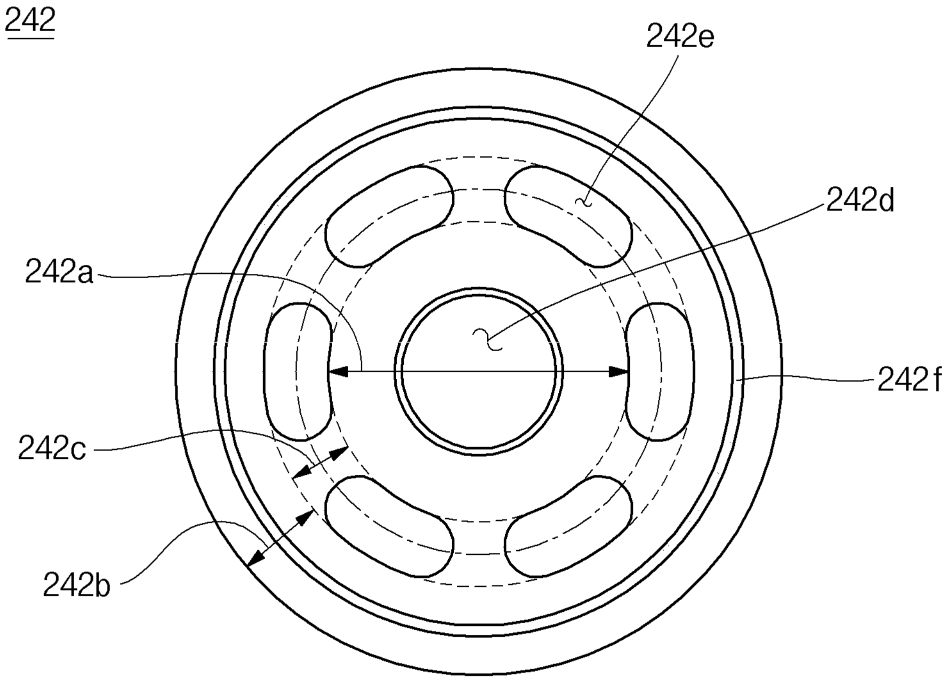
FIG. 7 is a plan view illustrating a support plate of the cylindrical lithium ion secondary battery according to another embodiment of the present invention.

FIG. 6 is a cross-sectional view of a cylindrical lithium ion secondary battery according to another embodiment of the present invention, and FIG. 7 is a plan view illustrating a support plate of the cylindrical lithium ion secondary battery according to another embodiment of the present invention.

Referring to FIGS. 6 and 7, the cylindrical lithium ion secondary battery 200 according to another embodiment includes a cylindrical can 110, an electrode assembly 120, and a cap assembly 240. Compared with the cap assembly 140 shown in FIG. 5, the cap assembly 240 is substantially the same as the cap assembly 140, except for a configuration of a support plate 242. Thus, the following description will focus on only the support plate 242.

The support plate 242 may be positioned under the top plate 141 and may include a first region 242*a*, a second region 242*b* and a third region 242*c*. The first region 242*a* is formed in close contact with an upper region 141*d* located inside a bent region 141*g* of the top plate top plate 141. In addition, a first through-hole 242*d* is formed roughly at the center of the first region 242*a*. The second region 242*b* is positioned at an exterior side of the first region 242*a* and is positioned lower than the first region 242*a*. Particularly, the second region 242*b* is disposed in close contact with the upper region 141*d* located outside the bent region 141*g* of the top plate 141. Therefore, the second region 242*b* is surrounded by the upper region 141*d*, a side region 141*e* and a lower region 141*f*, which are located outside the bent region 141*g*. Additionally, a groove 242*f* is formed on a top surface of the second region 242*b*. As illustrated in FIG. 7, the groove 242*f* is formed on the top surface of the second region 242*b* in a ring shape and contacts the upper region 141*d* formed at an exterior side of the bent region 141*g* of the top plate 141. The groove 242*f* may serve to decentralize the stress generated toward the center of the cap assembly 240 when an upper end of the cylindrical can 110 is clamped.

The groove 242*f* may be formed to have a depth of approximately 5% to approximately 20% of the thickness of the support plate 242. If the depth of the groove 242*f* is smaller than 5% of the thickness of the support plate 242, the stress generated toward the center of the cap assembly 240 when an upper end of the cylindrical can 110 is clamped, may not be sufficiently dispersed. In addition, if the depth of the groove 242*f* is greater than 20% of the thickness of the support plate 242, the support plate 242 may be easily deformed by the stress generated toward the center of the cap assembly 240 when an upper end of the cylindrical can 110 is clamped.

Although the foregoing embodiments have been described to practice the cylindrical lithium ion secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

What is claimed is:

1. A cylindrical lithium ion secondary battery comprising:
- a cylindrical can;
- an electrode assembly in the cylindrical can; and
- a cap assembly for sealing the cylindrical can,
- wherein the cap assembly comprises a top plate having a notch formed thereon, a support plate having a first through-hole formed through a center thereof, and a bottom plate electrically connected with the electrode assembly and connected to an inner surface of the top plate through the first through-hole, the top plate wrapping around an edge of the support plate, and
- wherein the support plate has a strength that is greater than a strength of the top plate,
- wherein the notch is positioned outside of a central region of the top plate overlapping the first through-hole.

2. The cylindrical lithium ion secondary battery of claim 1, wherein the support plate includes a first region having the first through-hole formed thereon, a second region positioned at an exterior side of the first region and positioned lower than the first region, and a third region connecting the first region and the second region to each other and including a plurality of second through-holes formed thereon.

3. The cylindrical lithium ion secondary battery of claim 2, wherein the third region is tilted to disperse a stress generated when an upper end of the cylindrical can is clamped to fix the cap assembly to the cylindrical can.

4. The cylindrical lithium ion secondary battery of claim 2, wherein a ring-shaped groove is formed on the second region to disperse a stress generated when an upper end of the cylindrical can is clamped to fix the cap assembly to the cylindrical can.

5. The cylindrical lithium ion secondary battery of claim 4, wherein the ring-shaped groove is formed to have a depth of 5% to 20% of a thickness of the support plate.

6. The cylindrical lithium ion secondary battery of claim 1, further comprising an insulation plate positioned between the support plate and the bottom plate and having a through-hole centrally located to correspond to the first through-hole of the support plate.

7. The cylindrical lithium ion secondary battery of claim 1, wherein, in response to an internal gas pressure of the cylindrical can being greater than an operating pressure and smaller than a breaking pressure, the top plate is configured to be upwardly convexly deformed and to electrically disconnect from the bottom plate.

8. The cylindrical lithium ion secondary battery of claim 1, wherein, in response to an internal gas pressure of the cylindrical can being greater than a breaking pressure, the notch of the top plate is configured to break.

9. The cylindrical lithium ion secondary battery of claim 1, further comprising an insulation gasket positioned between the cap assembly and the cylindrical can and insulating the cap assembly and the cylindrical can from each other.

* * * * *